(No Model.) 2 Sheets—Sheet 1.

H. C. HART.
KNIFE OR FORK.

No. 386,200. Patented July 17, 1888.

Witnesses:
Chas. B. Shumway.
Sidney A. Sanders

Inventor
Herbert C. Hart.
By Geo. D. Seymour
Atty.

(No Model.) 2 Sheets—Sheet 2.

H. C. HART.
KNIFE OR FORK.

No. 386,200. Patented July 17, 1888.

UNITED STATES PATENT OFFICE.

HUBERT C. HART, OF UNIONVILLE, CONNECTICUT.

KNIFE OR FORK.

SPECIFICATION forming part of Letters Patent No. 386,200, dated July 17, 1888.

Application filed October 3, 1887. Serial No. 251,313. (No model.)

*To all whom it may concern:*

Be it known that I, HUBERT C. HART, residing at Unionville, in the county of Hartford and State of Connecticut, have invented certain new and useful Improvements in Table Knives or Forks; and I do declare the following to be a full, clear, and exact description of the same, reference being had to the accompanying drawings, which form a part of this specification.

My invention relates to an improvement in that class of table knives or forks having sheet-metal handles, the object being to produce a cheap, light, stiff, well-balanced, and durable article adapted to be produced with great economy of labor, material, and tools, and to be easily kept clean and in order.

With these ends in view my invention consists in a knife or fork having a cupped sheet-metal handle, the forward ends of the flange whereof are drawn down and over the opposite edges of the blade or tine shank, so as to firmly clasp such shank and hold the two parts together.

Figure 1:
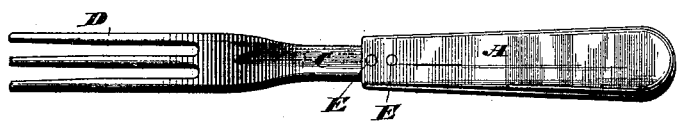
Figure 2:
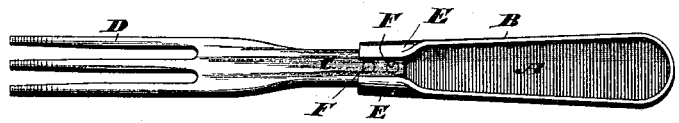
Figure 3:
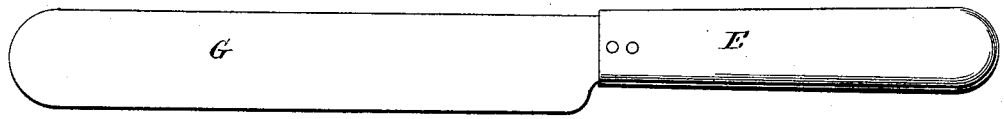
Figure 4:
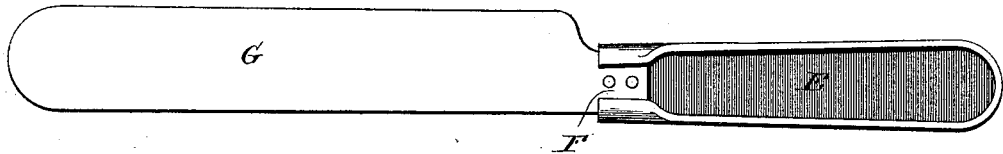

In the accompanying drawings, Figure 1 is a plan view of a fork embodying my invention. Fig. 2 is a similar reverse view thereof, and Figs. 3 and 4 are corresponding views showing the application of my invention to a knife.

As herein shown, reference now being had to Figs. 1 and 2 of the drawings, the cupped handle is struck up from a suitable sheet-metal blank and has a flat body portion, A, and a flange, B, offsetting therefrom at about a right angle and surrounding its sides and curved outer end. The tine-shank C of the tines D is inserted in the open inner end of such handle, which is secured to the shank by drawing the forward ends of the said flange over the opposite edges of the shank, as at E E, as shown. A very stiff union of the two parts is thus effected, as the binding leverage at E E is very short, and as the open character of the cupped handle enables a very perfect job to be had. For further security, one or more rivets, F F, may be put through the handle and shank and headed down upon them, respectively. The handle and shank may also be brazed together, if desired, the open character of the cupped handle also making this operation easy and effective.

The article may be finished by polishing or in any other approved manner.

The handle E of the knife (shown by Figs. 3 and 4) corresponds to the handle of the fork and is secured to the shank F of the blade G in the same way.

A knife or fork made as described is very light, stiff, peculiarly well-balanced, and capable of being produced without waste of stock and with the minimum of outlay for labor and tools. It is also easy to keep clean and in order, as the handle, being open, may be wiped perfectly dry, while closed hollow handles take water through their seams and rust out.

I am aware that a knife or fork having a wholly closed folded sheet-metal handle is not new, and that it is not new to rivet such a handle to a blade or tine shank. I do not therefore, broadly claim a knife or fork having a sheet-metal handle, or a knife or fork having a sheet-metal handle riveted to its blade or tine shank; but, Having fully described my invention, what I claim as new, and desire to secure by Letters Patent, is—

A knife or fork having a cupped handle, the forward ends of the flange whereof are drawn down and over the opposite edges of the blade or tine shank, so as to firmly clasp such shank and hold the two parts together, substantially as set forth.

In testimony whereof I have signed this specification in the presence of two subscribing witnesses.

HUBERT C. HART.

Witnesses:
CHAS. B. SHUMWAY,
C. L. SWAN, Jr.